United States Patent
Anglin et al.

(10) Patent No.: US 12,112,076 B2
(45) Date of Patent: *Oct. 8, 2024

(54) REPLICATION OF VERSIONS OF AN OBJECT FROM A SOURCE STORAGE TO A TARGET STORAGE

(71) Applicant: International Business Machines Corporation, Armonk, NY (US)

(72) Inventors: Matthew J. Anglin, Tucson, AZ (US); David M. Cannon, Tucson, AZ (US); Colin S. Dawson, Tucson, AZ (US); Erick C. Kissel, Tucson, AZ (US); Kristopher A. Larson, Tucson, AZ (US); Howard N. Martin, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 306 days.

This patent is subject to a terminal disclaimer.

(21) Appl. No.: 16/737,874

(22) Filed: Jan. 8, 2020

(65) Prior Publication Data

US 2020/0142602 A1    May 7, 2020

Related U.S. Application Data

(63) Continuation of application No. 14/815,844, filed on Jul. 31, 2015, now Pat. No. 10,725,708.

(51) Int. Cl.
   *G06F 3/06* (2006.01)
   *G06F 11/14* (2006.01)
   *G06F 16/11* (2019.01)

(52) U.S. Cl.
   CPC ............ *G06F 3/067* (2013.01); *G06F 3/0604* (2013.01); *G06F 3/0629* (2013.01); *G06F 11/1448* (2013.01); *G06F 16/125* (2019.01)

(58) Field of Classification Search
   CPC ...... G06F 3/067; G06F 16/125; G06F 3/0604; G06F 3/0629; G06F 11/1448
   See application file for complete search history.

(56) References Cited

U.S. PATENT DOCUMENTS

| 5,170,480 A | 12/1992 | Mohan et al. |
| 6,345,308 B1 | 2/2002 | Abe |

(Continued)

FOREIGN PATENT DOCUMENTS

| CA | 2741477 A1 | 4/2010 |
| CN | 1525337 | 9/2004 |

(Continued)

OTHER PUBLICATIONS

Watanabe, Toshiki, et al. "Update Propagation Strategies Considering Degree of Data Update in Peer-to-Peer Networks." International Conference on Database Systems for Advanced Applications. Springer, Berlin, Heidelberg, 2009. (Year: 2009).*

(Continued)

*Primary Examiner* — Mohsen Almani
(74) *Attorney, Agent, or Firm* — KONRAD, RAYNES, DAVDA & VICTOR LLP.; Alan S. Raynes; David W. Victor (57) ABSTRACT

Provided are a computer program product, system, and method for replication of versions of an object from a source storage to a target storage. A source retention policy indicates at least one source retention requirement to determine when to expire versions of an object at the source storage and a target retention policy indicates at least one target retention requirement to determine when to expire versions of the object at the target storage. The source and target retention requirements for versions of the object are different. The source retention policy is used to expire at least one version of the object at the source storage to satisfy the at least one source retention requirement. A number of the (Continued)

versions of the object maintained at the source storage and target storage differ due to the different source and target retention requirements.

20 Claims, 7 Drawing Sheets

(56) References Cited

U.S. PATENT DOCUMENTS

| | | |
|---|---|---|
| 6,463,454 B1 | 10/2002 | Lumelsky et al. |
| 6,466,980 B1 | 10/2002 | Lumelsky |
| 6,978,282 B1 | 12/2005 | Dings et al. |
| 7,076,620 B2 | 7/2006 | Takeda et al. |
| 7,203,712 B2 | 4/2007 | Adiba et al. |
| 7,246,258 B2 | 7/2007 | Chen et al. |
| 7,320,059 B1 | 1/2008 | Armangau et al. |
| 7,350,041 B1 | 3/2008 | Armangau et al. |
| 7,418,565 B2 | 8/2008 | Takeda et al. |
| 7,519,785 B1 | 4/2009 | Schultz et al. |
| 7,636,704 B2 | 12/2009 | Armangau et al. |
| 7,769,722 B1 | 8/2010 | Bergant et al. |
| 7,788,456 B1 | 8/2010 | Park |
| 7,979,546 B2 | 7/2011 | Hamel et al. |
| 8,286,030 B1* | 10/2012 | Chatterjee ........... G06F 11/1662 |
| | | 714/20 |
| 8,352,431 B1 | 1/2013 | Protopopov et al. |
| 8,379,645 B2 | 2/2013 | Dai et al. |
| 8,671,072 B1 | 3/2014 | Shah et al. |
| 8,706,833 B1 | 4/2014 | Bergant et al. |
| 8,743,881 B2 | 6/2014 | Dai et al. |
| 8,799,222 B2 | 8/2014 | Marathe et al. |
| 8,838,529 B2 | 9/2014 | Anglin et al. |
| 8,918,362 B2 | 12/2014 | Calder et al. |
| 8,972,343 B2 | 3/2015 | Hironaga et al. |
| 9,063,946 B1* | 6/2015 | Barber ................. G06F 16/125 |
| 9,659,080 B1 | 5/2017 | Drobychev et al. |
| 9,904,717 B2 | 2/2018 | Anglin et al. |
| 9,910,904 B2 | 3/2018 | Anglin et al. |
| 10,157,014 B1 | 12/2018 | Panidis et al. |
| 10,664,492 B2 | 5/2020 | Anglin et al. |
| 10,664,493 B2 | 5/2020 | Anglin et al. |
| 2003/0204557 A1 | 10/2003 | Mandal et al. |
| 2004/0153473 A1 | 8/2004 | Hutchinson et al. |
| 2004/0172509 A1 | 9/2004 | Takeda et al. |
| 2005/0027748 A1 | 2/2005 | Kisley |
| 2005/0273654 A1 | 12/2005 | Chen et al. |
| 2006/0053181 A1 | 3/2006 | Anand et al. |
| 2006/0161449 A1 | 7/2006 | McKinney |
| 2006/0174076 A1 | 8/2006 | Takeda et al. |
| 2006/0200831 A1 | 9/2006 | Straube et al. |
| 2007/0027935 A1 | 2/2007 | Haselton et al. |
| 2007/0050415 A1 | 3/2007 | Armangau et al. |
| 2007/0055835 A1 | 3/2007 | Malkin et al. |
| 2007/0136381 A1 | 6/2007 | Cannon et al. |
| 2007/0156842 A1 | 7/2007 | Vermeulen et al. |
| 2008/0082770 A1 | 4/2008 | Ahal |
| 2008/0250086 A1 | 10/2008 | Kisley |
| 2008/0282048 A1 | 11/2008 | Miura |
| 2009/0063587 A1 | 3/2009 | Jakob |
| 2009/0119346 A1 | 5/2009 | Lu et al. |
| 2009/0276771 A1 | 11/2009 | Nickolov |
| 2009/0282125 A1 | 11/2009 | Jeide |
| 2010/0063951 A1 | 3/2010 | Nagoya et al. |
| 2010/0114817 A1 | 5/2010 | Broeder et al. |
| 2010/0131480 A1 | 5/2010 | Schneider |
| 2010/0142547 A1 | 6/2010 | Dai et al. |
| 2010/0161551 A1 | 6/2010 | Whynot |
| 2011/0078110 A1 | 3/2011 | Joseph |
| 2011/0106802 A1 | 5/2011 | Pinkney et al. |
| 2011/0196830 A1 | 8/2011 | Zunger et al. |
| 2011/0196831 A1 | 8/2011 | Zunger et al. |
| 2011/0213781 A1 | 9/2011 | Hansel et al. |
| 2011/0282834 A1 | 11/2011 | Desai et al. |
| 2011/0313971 A1 | 12/2011 | Hironaga et al. |
| 2012/0233418 A1 | 9/2012 | Barton et al. |
| 2013/0024429 A1 | 1/2013 | Raas |
| 2013/0054523 A1 | 2/2013 | Anglin et al. |
| 2013/0054524 A1 | 2/2013 | Anglin et al. |
| 2013/0128775 A1 | 5/2013 | Dai et al. |
| 2015/0154271 A1* | 6/2015 | Iwasaki ................. G06F 16/275 |
| | | 707/618 |
| 2015/0169625 A1 | 6/2015 | Slik et al. |
| 2017/0031776 A1* | 2/2017 | Ren ..................... G06F 11/1438 |
| 2018/0159717 A1 | 6/2018 | Cormie et al. |

FOREIGN PATENT DOCUMENTS

| | | |
|---|---|---|
| CN | 101101563 A | 1/2008 |
| CN | 101414949 A | 4/2009 |
| CN | 102063500 A | 5/2011 |
| EP | 1933236 A1 | 6/2008 |
| JP | 11249874 A | 9/1999 |
| JP | 2003087491 A | 3/2003 |
| JP | 2005267157 A | 9/2005 |
| JP | 2005317017 A | 11/2005 |
| JP | 2008146577 A | 6/2008 |
| JP | 2009146425 A | 7/2009 |
| WO | 2010097849 A1 | 9/2010 |

OTHER PUBLICATIONS

List of IBM Patents or Patent Applications Treated as Related, pp. 2.

U.S. Patent Application, dated Aug. 30, 2011, for U.S. Appl. No. 13/221,670 invented by Matthew J. Anglin et al., Total 46 pages.

Preliminary Amendment, dated Apr. 25, 2012, for U.S. Appl. No. 13/221,670, filed Aug. 30, 2011, invented by Matthew J. Anglin et al., Total 11 pages.

Office Action, dated Jan. 12, 2013, for U.S. Appl. No. 13/221,670, filed Aug. 30, 2011, invented by Matthew J. Anglin et al., Total 29 pages.

Response to Office Action, dated Feb. 12, 2014, for U.S. Appl. No. 13/221,670, filed Aug. 30, 2011, invented by Matthew J. Anglin et al., Total 17 pages.

Final Office Action, dated Jun. 5, 2014, for U.S. Appl. No. 13/221,670, filed Aug. 30, 2011, invented by Matthew J. Anglin et al., Total 21 pages.

Response to Final Office Action, dated Sep. 5, 2014, for for U.S. Appl. No. 13/221,670, filed Aug. 30, 2011, invented by Matthew J. Anglin et al. Total 16 pages.

Office Action, dated Nov. 20, 2014, for U.S. Appl. No. 13/221,670, filed Aug. 30, 2011, invented by Matthew J. Anglin et al., Total 15 pages.

Response to Office Action, dated Feb. 20, 2015, for U.S. Appl. No. 13/221,670, filed Aug. 30, 2011, invented by Matthew J. Anglin et al., Total 16 pages.

Final Office Action, dated Jun. 23, 2015, for U.S. Appl. No. 13/221,670, filed Aug. 30, 2011, invented by Matthew J. Anglin et al., Total 23 pages.

Response to Final Office Action, dated Sep. 22, 2015, for U.S. Appl. No. 13/221,670, filed Aug. 30, 2011, invented by Matthew J. Anglin et al., Total 17 pages.

Office Action dated Dec. 21, 2015, pp. 24, for U.S. Appl. No. 13/221,670, filed Aug. 30, 2011.

Response to Office Action, dated Mar. 21, 2016, for U.S. Appl. No. 13/221,670, filed Aug. 30, 2011, invented by Matthew J. Anglin et al., Total 17 pages.

Final Office Action, dated Jul. 11, 2016, for U.S. Appl. No. 13/221,670, filed Aug. 30, 2011, invented by Matthew J. Anglin et al., Total 27 pages.

Response to Final Office Action, dated Oct. 11, 2016, for U.S. Appl. No. 13/221,670, filed Aug. 30, 2011, invented by Matthew J. Anglin et al., Total 18 pages.

Notice of Allowance, dated Mar. 14, 2017, for U.S. Appl. No. 13/221,670, filed Aug. 30, 2011, invented by Matthew J. Anglin et al., Total 9 pages.

(56) References Cited

OTHER PUBLICATIONS

Office Action, dated May 17, 2017, for U.S. Appl. No. 13/221,670, filed Aug. 30, 2011, invented by Matthew J. Anglin et al., Total 12 pages.
Response to Office Action, dated Sep. 18, 2017, for U.S. Appl. No. 13/221,670, filed Aug. 30, 2011, invented by Matthew J. Anglin et al., Total 15 pages.
Notice of Allowance, dated Oct. 23, 2017, for U.S. Appl. No. 13/221,670, filed Aug. 30, 2011, invented by Matthew J. Anglin et al., Total 9 pages.
US Patent Application, dated Apr. 25, 2012, for U.S. Appl. No. 13/456,136 invented by Matthew J. Anglin et al., Total 46 pages.
Preliminary Amendment, dated Apr. 25, 2012, for U.S. Appl. No. 13/456,136, filed Apr. 25, 2012, invented by Matthew J. Anglin et al., Total 7 pages.
Office Action, dated Nov. 13, 2013, for U.S. Appl. No. 13/456,136, filed Apr. 25, 2012, invented by Matthew J. Anglin et al., Total 17 pages.
Response to Office Action, dated Feb. 13, 2014, for U.S. Appl. No. 13/456,136, filed Apr. 25, 2012, invented by Matthew J. Anglin et al., Total 11 pages.
Final Office Action, dated Jun. 6, 2014, for U.S. Appl. No. 13/456,136, filed Apr. 25, 2012, invented by Matthew J. Anglin et al., Total 16 pages.
Response to Final Office Action, dated Sep. 5, 2014, for U.S. Appl. No. 13/456,136, filed Apr. 25, 2012, invented by Matthew J. Anglin et al., Total 11 pages.
Office Action, dated Nov. 20, 2014, for U.S. Appl. No. 13/456,136, filed Apr. 25, 2012, invented by Matthew J. Anglin et al., Total 12 pages.
Response to Office Action, dated Feb. 20, 2015, for U.S. Appl. No. 13/456,136, filed Apr. 25, 2012, invented by Matthew J. Anglin et al., Total 11 pages.
Final Office Action, dated Jun. 23, 2015, for U.S. Appl. No. 13/456,136, filed Apr. 25, 12, invented by Matthew J. Anglin et al., Total 21 pages.
Response to Office Action, dated Sep. 22, 2015, for U.S. Appl. No. 13/456,136, filed Apr. 25, 2012, invented by Matthew J. Anglin et al., Total 12 pages.
Office Action dated Dec. 21, 2015, for U.S. Appl. No. 13/456,136, filed Apr. 25, 2012, Total 22 pages.
Response to Office Action, dated Mar. 21, 2016, for U.S. Appl. No. 13/456,136, filed Apr. 25, 2012, Total 12 pages.
Final Office Action, dated Jul. 11, 2016, for U.S. Appl. No. 13/456,136, filed Apr. 25, 2012, invented by Matthew J. Anglin et al., Total 16 pages.
Response to Final Office Action, dated Oct. 11, 2016, for U.S. Appl. No. 13/456,136, filed Apr. 25, 2012, invented by Matthew J. Anglin et al., Total 13 pages.
Notice of Allowance, dated Mar. 13, 2017, for U.S. Appl. No. 13/456,136, filed Apr. 25, 2012, invented by Matthew J. Anglin et al., Total 9 pages.
Office Action, dated May 17, 2017, for U.S. Appl. No. 13/456,136, filed Apr. 25, 2012, invented by Matthew J. Anglin et al., Total 12 pages.
Response to Office Action, dated Sep. 18, 2017, for U.S. Appl. No. 13/456,136, filed Apr. 25, 2012, invented by Matthew J. Anglin et al., Total 10 pages.
Notice of Allowance, dated Oct. 18, 2017, for for U.S. Appl. No. 13/456,136, filed Apr. 25, 2012, invented by Matthew J. Anglin et al., Total 10 pages.
US Patent Application, dated Dec. 4, 2017, for U.S. Appl. No. 15/831,272 invented by Matthew J. Anglin et al., Total 46 pages.
Office Action 1, dated Sep. 19, 2019, for U.S. Appl. No. 15/831,272 invented by Matthew J. Anglin et al., Total 48 pages.
Notice of Allowance, dated Oct. 18, 2017, for U.S. Appl. No. 13/456,136, filed Apr. 25, 2012, invented by Matthew J. Anglin et al., Total 10 pages.
Application dated Dec. 4, 2017, for U.S. Appl. No. 15/831,272 invented by Matthew J. Anglin et al., Total 46 pages.

Preliminary Amendment, dated Dec. 4, 2017, for U.S. Appl. No. 15/831,272 invented by Matthew J. Anglin et al., Total 9 pages.
Resp to OA1 for 37.273C2 dated Dec. 19, 2019.
US Patent Application, dated Dec. 5, 2017, for U.S. Appl. No. 15/831,393 invented by Matthew J. Anglin et al., Total 46 pages.
Preliminary Amendment, dated Dec. 4, 2017, for U.S. Appl. No. 15/831,393 invented by Matthew J. Anglin et al., Total 8 pages.
OA1, dated Sep. 20, 2019, for U.S. Appl. No. 15/831,393, filed Dec. 5, 2017, invented by M.J. Anglin et al., Total 48 pp.
Resp to OA1, dated Dec. 20, 2019, for U.S. Appl. No. 15/831,393, filed Dec. 5, 2017, invented by M.J. Anglin et al., Total 8 pp.
US Patent Application, dated Jul. 31, 2015, for U.S. Appl. No. 14/815,844 invented by Matthew J. Anglin et al., Total 32 pages.
Notice of Allowance, dated Jan. 12, 2020, for U.S. Appl. No. 15/831,272, filed Dec. 4, 2017, invented by Matthew J. Anglin et al. Total 14 pages.
Notice of Allowance, dated Jan. 22, 2020, for U.S. Appl. No. 15/831,393, filed Dec. 5, 2017, invented by M.J. Anglin et al., Total 14 pages.
Preliminary Amendment, dated , for U.S. Appl. No. 14/815,844 invented by Matthew J. Anglin et al., Total pages.
Office Action 1, dated Dec. 1, 2017, for U.S. Appl. No. 14/815,844 invented by Matthew J. Anglin et al., Total 42 pages.
Response to Office Action 1, dated Mar. 1, 2018, for U.S. Appl. No. 14/815,844 invented by Matthew J. Anglin et al., Total 16 pages.
Final Office Action, dated Jul. 16, 2018, for U.S. Appl. No. 14/815,844 invented by Matthew J. Anglin et al., Total 27 pages.
Response to Final Office Action, dated Oct. 16, 2018, for U.S. Appl. No. 14/815,844 invented by Matthew J. Anglin et al., Total 13 pages.
Office Action 3, dated Nov. 29, 2018, for U.S. Appl. No. 14/815,844 invented by Matthew J. Anglin et al., Total 18 pages.
Response to Office Action 3, dated Feb. 28, 2019, for U.S. Appl. No. 14/815,844 invented by Matthew J. Anglin et al., Total 13 pages.
Final Office Action, dated Jun. 3, 2019, for U.S. Appl. No. 14/815,844 invented by Matthew J. Anglin et al., Total 19 pp.
Notice of Allowance, dated Oct. 8, 2019, for U.S. Appl. No. 14/815,844 invented by Matthew J. Anglin et al., Total 8 pp.
U.S. Patent Application entitled, "Applying Replication Rules to Determine Whether to Replicate Objects", filed Aug. 30, 2011, by inventors M. Anglin, D. Cannon, C. Dawson, and H. Martin.
US Patent Application, dated Jul. 31, 2014, for U.S. Appl. No. 14/448,953, filed Jul. 31, 2014, invented by Matthew J. Anglin, Total 32 pages.
Information Materials for IDS, dated Dec. 16, 2014, Total 1 page.
Information Materials for IDS, dated Feb. 17, 2016, Total 4 pages.
Information Materials for IDS, dated Jul. 31, 2014, Total 2 pages.
Information Materials for IDS, dated Jul. 21, 2015, Total 2 pages.
Chinese Office Action, dated Sep. 10, 2016, Total 2 pages.
Search Report, dated Sep. 20, 2016, Total 2 pages.
International Search Report, dated Dec. 18, 2012, for International Application No. PCT/CA2012/050593, filed Aug. 28, 2012, pp. 1-4.
Written Opinion of the International Searching Authority, dated Dec. 18, 2012, for International Application No. PCT/CA2012/050593, filed Aug. 28, 2012, pp. 1-4.
Machine Translation for Chinese Office Action, Publication No. 201280041913.7, Translated on Sep. 20, 2016, Total 5 pages.
Machine Translation for JP2008146577, published Jun. 26, 2008 Total 26 pages.
Machine Translation for WO2010097849, published Sep. 2, 2010, Total 22 pages.
Machine Translation for CN1525337, published Sep. 1, 2004, Total 27 pages.
Machine Translation for CN101101563, published Jan. 9, 2008, Total 14 pages.
Machine Translation for JP2009-146425, published Jul. 2, 2009, Total 55 pages.
Machine Translation for JP2003-087491, published Mar. 20, 2003, Total 32 pages.
Machine Translation for JP2005267157, published Sep. 29, 2005, Total 36 pages.
Machine Translation for CN102063500, published May 18, 2011, Total 9 pages.

(56) References Cited

OTHER PUBLICATIONS

Machine Translation for JP2005-317017, published Nov. 10, 2005, Total 51 pages.
Machine Translation for JP2008-146577, published Jun. 26, 2008, Total 77 pages.
U.S. Pat. No. 7,076,620 is an English counterpart to CN1525337.
U.S. Pat. No. 7,418,565 is an English counterpart to CN1525337.
US Publication 2006/174076 is an English counterpart to CN1525337.
US Publication 2004/172509 is an English counterpart to CN1525337.
US20110313971 is an English language counterpart of WO2010097849.
US20080282048 is an English language counterpart of JP2008146577.
U.S. Pat. No. 6,345,308 is an English counterpart to JP11249874.
U.S. Pat. No. 7,246,258 is an English counterpart to JP2005317017.
U.S. Pat. No. 8,972,343 is an English counterpart to WO2010097849.
U.S. Pat. No. 8,379,645 is an English Translation for CN101414949.
U.S. Pat. No. 8,743,881 is an English Translation for CN101414949.
Publication 20100142547 is an English Translation for CN101414949.
Publication 2005273654 is an English Counterpart to JP2005317017.
Publication 20130128775 is an English Translation for CN101414949.
Publication US20110313971 is an English language counterpart of WO2010097849.
P. Mell, "The NIST Definition of Cloud Computing (Draft)", National Institute of Standards and Technology, Special Publication 800-145 (draft), Jan. 2011, pp. 1-7.
"Recovery Points on Source and Target Are Not The Same (146327)" dated May 15, 2015, (online), retrieved from the Internet at URL>https://support.software.dell.com/appassure/kb/146327, Total 1 page.
Amendment Submitted with Petition to Withdraw and Request for Continued Examination, dated Jan. 13, 2020, for U.S. Appl. No. 14/815,844, filed Jul. 31, 2015, Total 10 pages.
Notice of Allowance 2, dated Mar. 18, 2020, for U.S. Appl. No. 14/815,844, filed Jul. 31, 2015, Total 17 Pages.
DE Office Action dated Jul. 10, 2020 (including machine translation), for Application No. 11 2012 002 762.0, 16pp. total including translation.
Response dated Dec. 14, 2020, (including machine translation), to DE Office Action dated Jul. 10, 2020, for Application No. 11 2012 002 762.0, 74 pp. total including translation.

* cited by examiner

Object Information

| Operation | Source | Target |
|---|---|---|
| Store initial version | A1 | |
| Replicate | A1 | A1 |
| Store 2nd version | A2, A1 | A1 |
| Replicate | A2, A1 | A2, A1 |
| Store 3rd version | A3, A2, A1 | A2, A1 |
| Replicate | A3, A2, A1 | A3, A2, A1 |
| Expire on target | A3, A2, A1 | A3, A2 |
| Store 4th version | A4, A3, A2, A1 | A3, A2 |
| Expire on source | A4, A3, A2 | A3, A2 |
| Replicate | A4, A3, A2 | A4, A3, A2 |
| Expire on target | A4, A3, A2 | A4, A3 |

FIG. 6

| Operation | Source | Target |
|---|---|---|
| Store initial version | A1 | |
| Replicate | A1 | A1 |
| Store 2nd version | A2, A1 | A1 |
| Replicate | A2, A1 | A2, A1 |
| Store 3rd version | A3, A2, A1 | A2, A1 |
| Replicate | A3, A2, A1 | A3, A2, A1 |
| Expire on source | A3, A2 | A3, A2, A1 |
| Store 4th version | A4, A3, A2 | A3, A2, A1 |
| Replicate | A4, A3, A2 | A4, A3, A2, A1 |
| Expire on source | A4, A3 | A4, A3, A2, A1 |
| Expire on target | A4, A3 | A4, A3, A2 |

FIG. 7

| Operation | Source | Target |
|---|---|---|
| Store initial version | A1 | |
| Store 2nd version | A2, A1 | |
| Store 3rd version | A3, A2, A1 | |
| Expire on source | A3, A2, A1 | |
| Replicate | A3, A2, A1 | A3, A2, A1 |
| Expire on source | A3, A2 | A3, A2, A1 |

800 — Store 3rd version
802 — Expire on source
804 — Replicate

REPLICATION OF VERSIONS OF AN OBJECT FROM A SOURCE STORAGE TO A TARGET STORAGE

BACKGROUND OF THE INVENTION

1. Field of the Invention

The present invention relates to a computer program product, system, and method for replication of versions of an object from a source storage to a target storage.

2. Description of the Related Art

Data replication is used to replicate data belonging to multiple client systems from one server to another server, so that if the main source server to which data is being backed-up goes down, the clients can recover their data from the replication site. A storage-management server such as Tivoli® Storage Manager (TSM) stores data objects in one or more storage pools and uses a database for tracking metadata about the stored objects. (Tivoli is a trademark of International Business Machines Corporation worldwide). The storage management server may replicate the data objects to a remote location for disaster recovery purposes. Some of the methods used to transfer data to a remote location include physically transporting tapes containing copies of the data from the source site to the disaster recovery site, electronically transmitting the data (TSM export/import) or using hardware replication of the source site disk storage to create a mirror of the data.

There is a need in the art for improved techniques for replicating objects from one server to another.

SUMMARY

Provided are a computer program product, system, and method for replication of versions of an object from a source storage to a target storage. A source retention policy indicates at least one source retention requirement to determine when to expire versions of an object at the source storage and a target retention policy indicates at least one target retention requirement to determine when to expire versions of the object at the target storage. The source and target retention requirements for versions of the object are different. A new version of the object is replicated from the source storage to the target storage. The source retention policy is used to expire at least one version of the object at the source storage to satisfy the at least one source retention requirement. A number of the versions of the object maintained at the source storage differs from a number of the versions of the object maintained at the target storage due to the different source and target retention requirements.

DETAILED DESCRIPTION

Each time a backup of the same object is performed, a new version is created. Retention policies indicate how many of the older versions to maintain, and may specify an age limit and retention number limit of versions of the object to maintain. Described embodiments provide techniques for replicating versions of an object from a source storage to a target storage and expiring the versions on the source storage using a source retention policy and target retention policy specifying different source and target retention number of versions that may be maintained on the source and target storages, respectively.

In the described embodiments, the source and target retention policies may have different retention policies, such as indicating different source and target retention number of versions of the object to retain, respectively. Further, the target retention policy may be used to determine a number of unreplicated versions of the object at the source storage to replicate to the target storage and to determine the number of unreplicated versions of the object to expire when the source and target retention numbers of versions are different.

Allowing for different retention policies at the source and target may be advantageous in a situation where a source storage has limited storage resources for production and backup versions and a target storage at a remote site has more ample storage, such that different retention policies are optimal for reflecting the need to limit versions of an object at the source production site and allowing more versions to be retained on the target storage. Alternatively, different retention policies may be preferable when the source storage can retain more versions than the target storage. Another retention policy may specify to only maintain the active version on the target storage 110a for disaster recovery.

Figure 1:
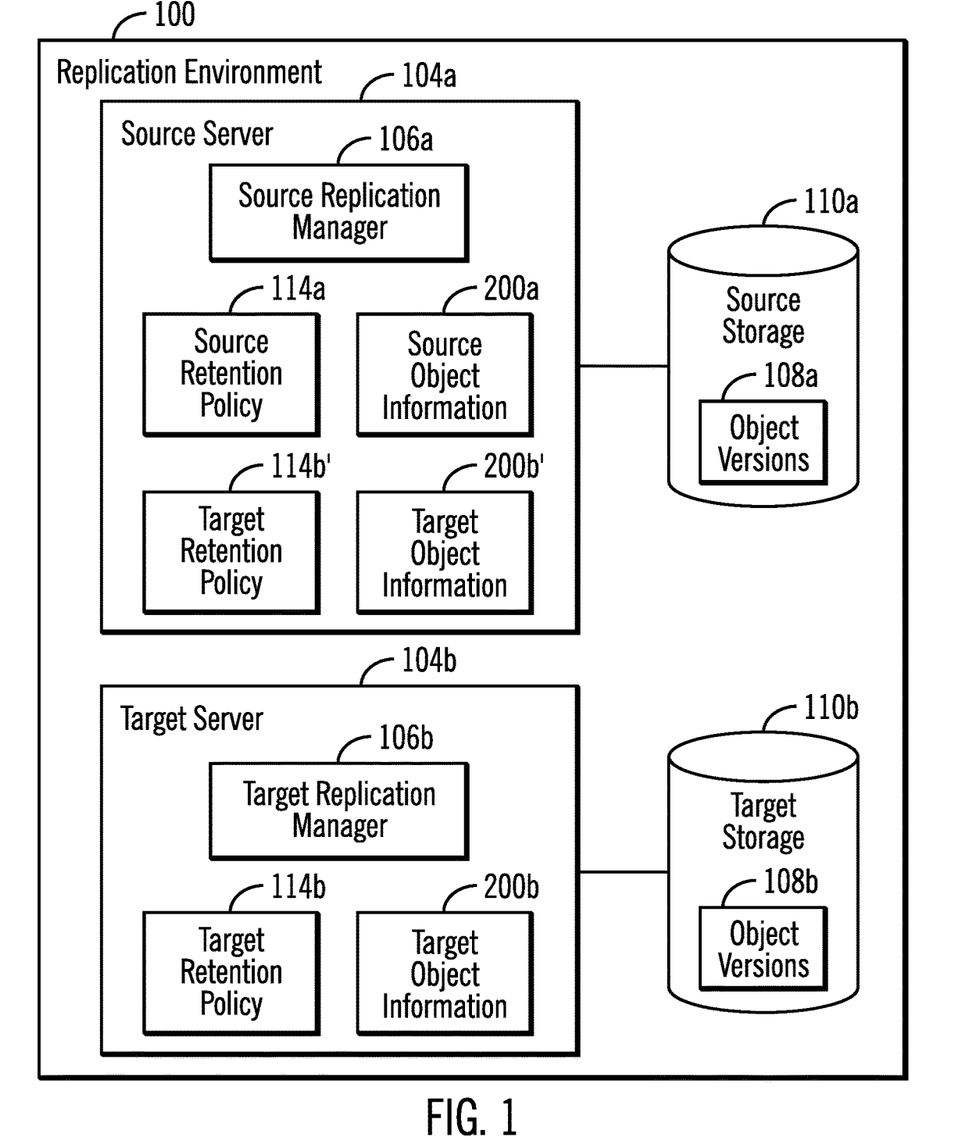
FIG. 1 illustrates a replication environment in which embodiments are implemented.

FIG. 1 illustrates an embodiment of a replication environment 100 having a source server 104a and target server 104b including a source replication manager 106a and target replication manager 106b, respectively, to replicate versions of an object 108a at a source storage 110a to copies of the versions of the object 108b at target storage 110b. The replication may be performed on behalf of a client node (not shown) connected to the source server 104a to replicate objects owned by the client node. The source server 104a and target server 104b maintain versions of one or more data objects as defined in the object information 200a and 200b, respectively.

The source server 104a maintains a source retention policy 114a that may indicate at least one of a source age limit and source retention number limit of versions of an object to retain at the source storage 110a, and may specify the number of active and inactive versions to retain. An active version is the most recent version of an object still resident on the protected client system, whereas inactive versions are previous versions that have been modified or deleted from the client system. The target server 102b maintains a target retention policy 114b that may indicate at least one of a target age limit and target retention number limit of the active and inactive versions to retain at the target storage 110b. The source server 104a may maintain a copy of the target retention policy 114b' to use to determine which versions of the object 108a to replicate and expire.

The source server 104a and target server 104b maintain object information 200a and 200b, respectively, having information on the versions of an object maintained in their respective storages 110a, 110b. The source server 104a may further maintain a copy of the target object information 200b' to use to determine which versions of the object 108a to replicate. The source server 104a may obtain the target object information 200b and retention policy 114b by querying the target server 104b or by the target server 104b forwarding such information when there are changes to the target retention policy 114b and target object information 200b.

Although FIG. 1 is described with respect to versions of one object, the source 110a and target 110b storages may maintain versions of multiple objects that are replicated.

The source server 104a and target server 104b may be implemented in separate computer devices that communicate over a network, such as a local area network (LAN), storage area network (SAN), wide area network (WAN), etc. In further embodiments, the source server 104a and target 104b may be implemented on one or two computer systems. If the source server 104a and target server 104b are in the same system, then they may communicate over a bus or via memory.

The source 110a and target 110b storages may each be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Although a certain number of instances of elements, such as servers, storages, active and inactive copy relationships, etc., are shown, there may be any number of these components.

The source replication manager 106a and target replication manager 106b may comprise software programs in a memory executed by a processor. In an alternative embodiment, some portion or all of the programs 106a, 106b may be implemented in a hardware component, such as a dedicated integrated circuit, e.g., Application Specific Integrated Circuit (ASIC), expansion card, etc.

Although the source replication manager 106a and target replication manager 106b are shown as separate components, in alternative implementations the functions performed by these components 106a, 106b may be implemented in a single program component in a single computer system or in more than two program components in more than two computer devices.

The source 106a and target 106b replication managers may be used by client nodes to recover objects as part of a restore operation.

Figure 2:
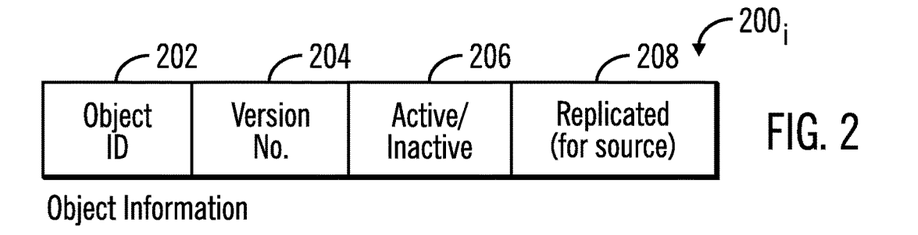
FIG. 2 illustrates an embodiment of object information.

FIG. 2 illustrates an instance of object information $200_i$ that may be maintained in the source 200a and target 200b object information. The object information $200_i$ may indicate an object identifier (ID) 202, a version number 204 of the object 202, indication 206 that the version is active or inactive, and for the source object information 200a a replication field 208 indicating whether the version 204 of the object 202 has been replicated to the target server 104b.

The object information 200a and 200b may be implemented in a database, structured file, index, table, and other data structures known in the art.

Figure 3A:
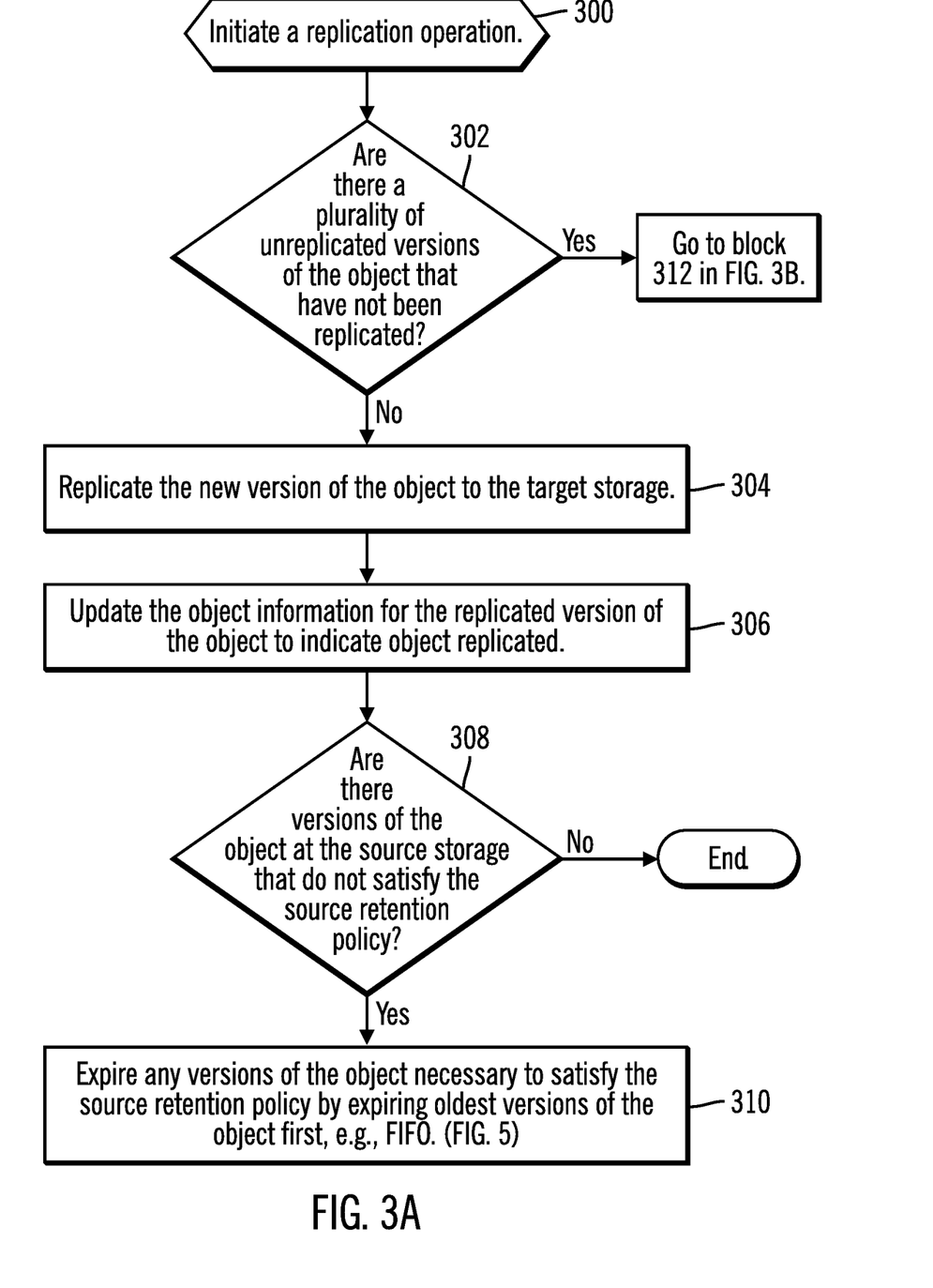
FIGS. 3a and 3b illustrate an embodiment of operations to replicate versions of an object from a source storage to a target storage.
Figure 3B:
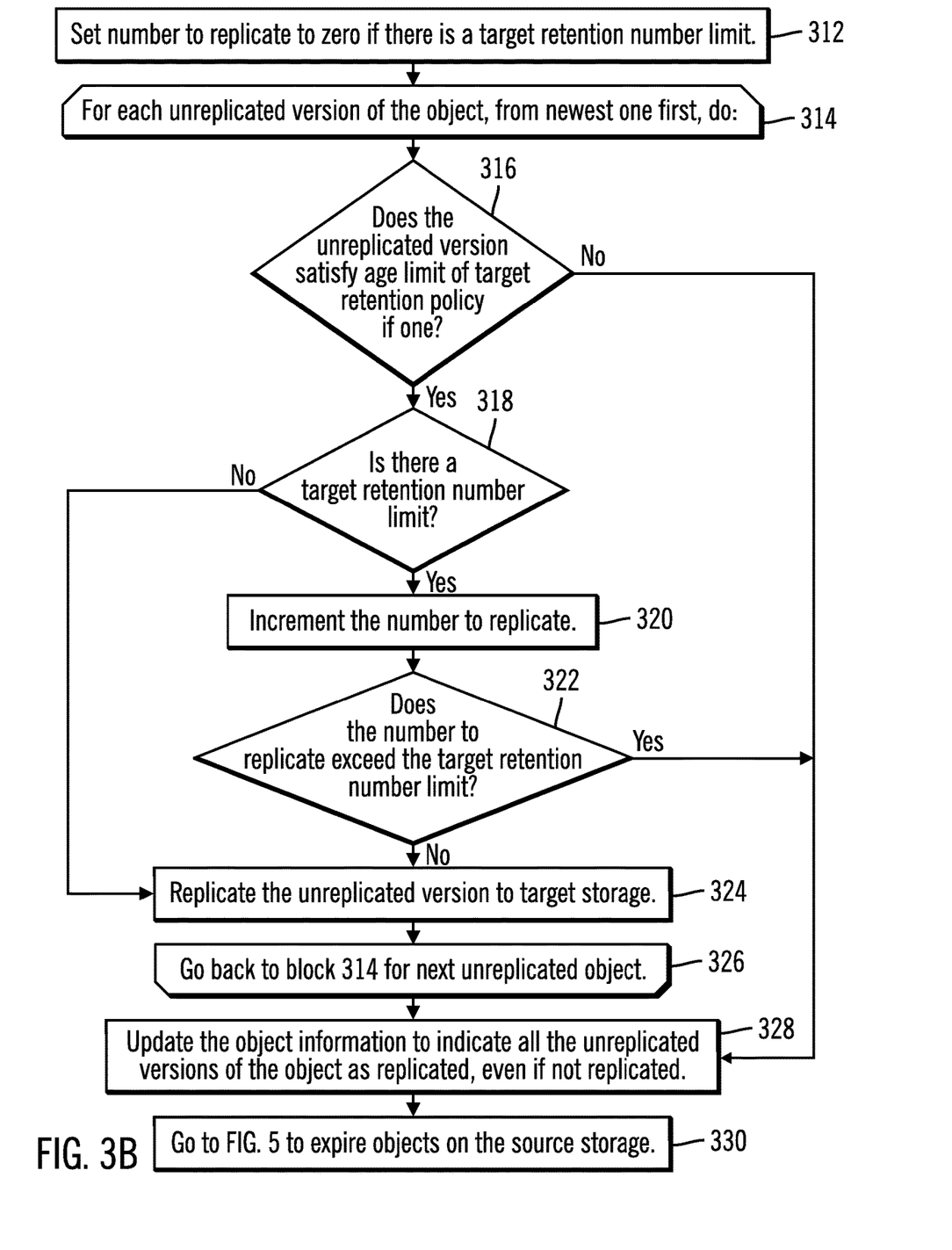

FIGS. 3a and 3b illustrate an embodiment of operations performed by the source replication manager 106a to replicate versions of an object 108a from the source storage 110a to the target storage 110b to store as versions of the object 108b. The replication (at block 300) may be initiated in response to creating a new active version, such as immediate replication when the object 108a has changed, or after a number of new versions of the object have been created, such as periodic replication. If (at block 302) there is only one unreplicated version of the object 108a that has not been replicated to the target storage 110b, then the source replication manager 106a replicates (at block 304) the new version of the object 108a to the target storage 110b. The source object information 200a for the replicated version of the object is updated (at block 306) to indicate that the object was replicated, such as by updating the replicated field 208 to indicate the object 202 and version 204 was replicated. If (at block 308) the versions of the objects 108a at the source storage 110a do not satisfy the source retention policy 114a, in terms of age limits of the objects and/or number limits of the versions, then the source replication manager 106a expires (at block 310) any versions of the object 108a necessary to satisfy the source retention policy 114a. For example, any versions having an age exceeding an age limit and/or exceeding the source retention number limit may be deleted, such as by expiring oldest versions of the object first, e.g., First-In-First-Out (FIFO), as further described with respect to FIG. 5. If (from the no branch at block 308) the number of versions 108a satisfies the source retention policy 114a, then control ends.

If (at block 302) there are a plurality of unreplicated versions of the object, then control proceeds to block 312 et seq. in FIG. 3b to determine whether to replicate unreplicated versions in a manner that satisfies the target retention policy 114b, such as an age limit and/or retention number limit. At block 312, a number to replicate is set to zero if there is a target retention number limit. A loop of operations is then performed for each unreplicated version of the object, from a newest one to oldest, i.e., LIFO. If (at block 316) the unreplicated version satisfies the age limit of the target retention policy 114b', which is also satisfied if there is no age limit, then if (at block 318) there is a target retention number limit, then the number of versions to replicate is incremented (at block 320). If (at block 322) the number to replicate at the source does not exceed the target retention number limit of the target retention policy 114b', then the version of the object is replicated (at block 324) to the target storage 110b. If (at block 318) there is no target retention limit after the target age limit has been satisfied, then control proceeds to block 324 to replicate the object.

After all unreplicated versions have been considered (from block 326) or if the number to replicate exceeds the target retention policy number limit (from the yes branch of block 322) or if the unreplicated version does not satisfy the target age limit (from the no branch of block 316), then control proceeds to block 328 to stop considering further unreplicated versions and update the object information 200 to indicate that any unreplicated versions are replicated. The object information 200 may be updated by updating field 208 in the object information instance $200_i$.

From blocks 316 and 322, further older unreplicated versions do not need to be considered because such further versions would not satisfy any target age and/or number limits of the target retention policy 114b if they are not satisfied after considering a more recent unreplicated version of the object.

With the operations of FIGS. 3a and 3b, the source replication manager 106a uses the target retention policy 114b' to determine whether unreplicated versions of the object should be replicated based on any target age limit and/or retention number limit specified in the target retention policy 114b. If there is a retention number limit, then unreplicated versions will not be replicated if doing so would violate any target age limits or total retention number limits. The unreplicated versions may be considered from newest ones first, such that at any point if one of the target age and/or retention number limits would be exceeded, then no further unreplicated objects would be replicated if the previously considered newer version does not satisfy age and or total retention number limits of the target retention policy 114b. In this way, if the source retention number of versions to have according to the source retention policy 114a exceeds the target retention number limit, then the source replication manager 106a replicates a number of at least one of the unreplicated versions of the object at the source storage to the target storage such that the replicated number does not exceed the target retention number limit. However, if the target retention number exceeds the source retention number, then the source replication manager 106a replicates a number of at least one of the unreplicated versions of the object at the source storage such that the replicated number does not exceed the target retention number limit.

In this way the target retention policy 114b is used by the source replication manager 104a to determine a number of unreplicated versions of the object to replicate when there are a plurality of unreplicated versions of the object. With the operations of FIGS. 3a and 3b, a number of at least one of the unreplicated versions of the object at the source storage is replicated to the target storage such that the replicated number of the unreplicated versions of the object will be stored on the target storage according to the target storage policy. For instance, a number of at least one of the unreplicated versions of the object at the source storage is replicated such that the replicated number of the at least one of the unreplicated versions of the object does not exceed a target retention number limit of the target retention policy.

Figure 4:
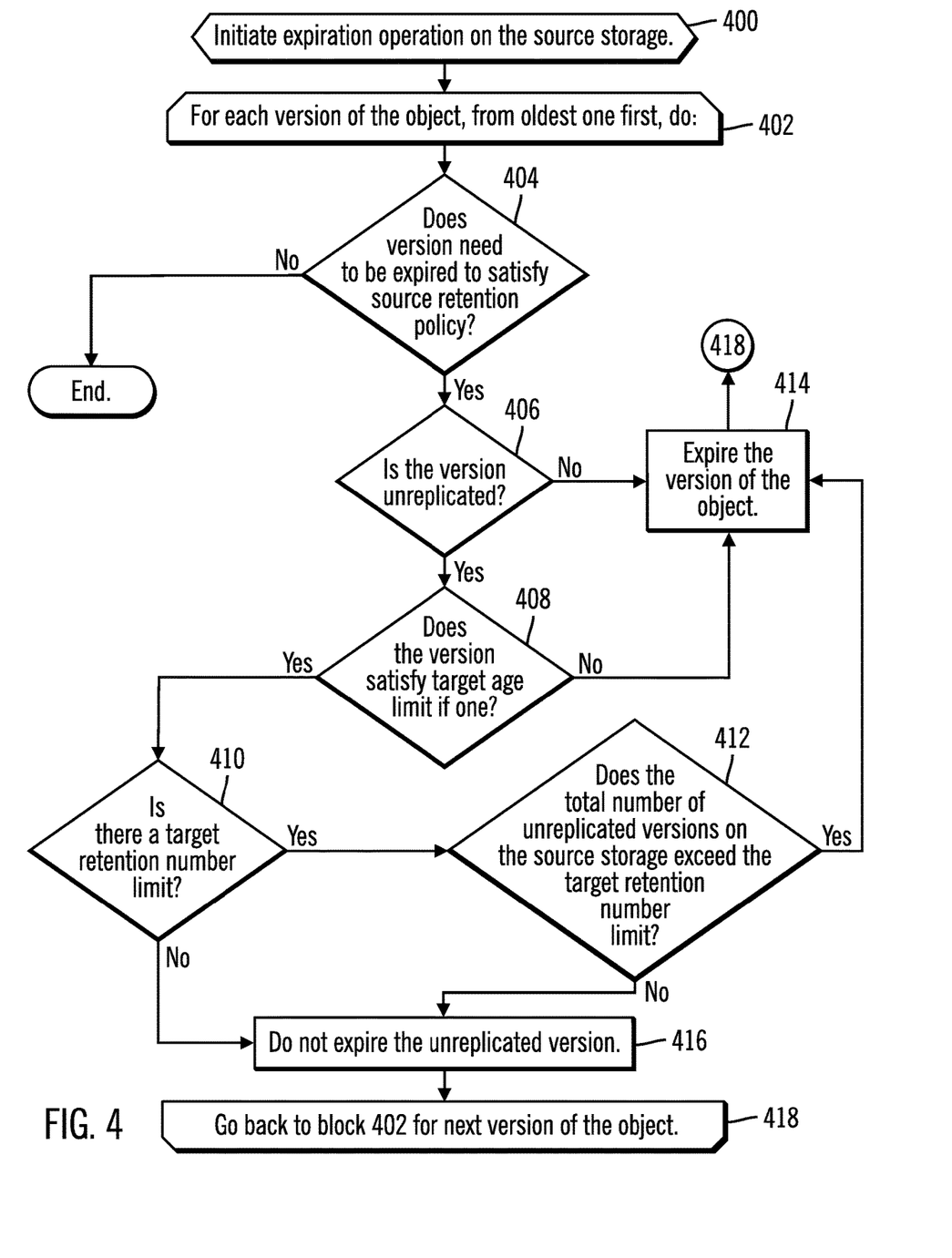
FIG. 4 illustrates an embodiment of operations to expire versions of an object on the source storage.

FIG. 4 illustrates an embodiment performed by the source replication manager 106a, or some other component such as a source expiration manager, to expire versions of the object 108a at the source storage 110a. Upon initiating (at block 400) an expiration operation on the source storage 110a, a loop of operations is performed at blocks 402 through 418 for each version of the object on the source storage, from the oldest one to most recent version. If (at block 404) the version does not need to be expired to satisfy the source retention policy 114a, e.g., target age and/or retention number limits, then control ends. That is, if the oldest version number satisfies the policies, then expiration processing can end.

However, if the current oldest version being considered does not satisfy the source retention policy, i.e., is too old or too many versions on the source storage 110a, then if (at block 406) the version is unreplicated, then the source replication manager 106a determines whether the version satisfies a target age limit (if there is one). If (at block 408) the age limit is satisfied, which is also satisfied if there is no target age limit, and if (at block 410) there is a target retention number limit, then the source replication manager 106a determines whether the total number of unreplicated versions on the source storage 110a exceeds the target retention number limit. If (at blocks 408 and 410) the age limit is satisfied and there is no retention number limit or if (at block 412) the number of unreplicated versions does not exceed a target retention number limit, then the unreplicated object is not expired (at block 416) even if its presence violates the source retention policy 114a requirements.

If the version is not unreplicated (from the no branch of block 406) or if the version does not satisfy the target age limit (from the no branch of block 408) or if the total number of unreplicated versions exceeds the target retention number limit (from the yes branch of block 412), then the version is expired (at block 414) to satisfy the source storage retention policy 114a. From block 414, control proceeds to block 418 to consider the next oldest version of the object on the source storage 110a.

With the operations of FIG. 4, unreplicated versions of the object on the source storage 110a are expired to attempt to satisfy the source retention policy without expiring unreplicated objects that could be stored on the target storage according to the target retention policy. Unreplicated versions of the object are expired if the unreplicated version does not satisfy an age limit when included in the target retention policy 114b and one of the unreplicated versions of the object is expired if a total number of unreplicated versions on the source storage exceeds a target retention number limit when included in the target retention policy 114b. The unreplicated versions are not expired when they satisfy the age limit and/or the total number of unreplicated versions does not exceed the target retention number limit.

Figure 5:
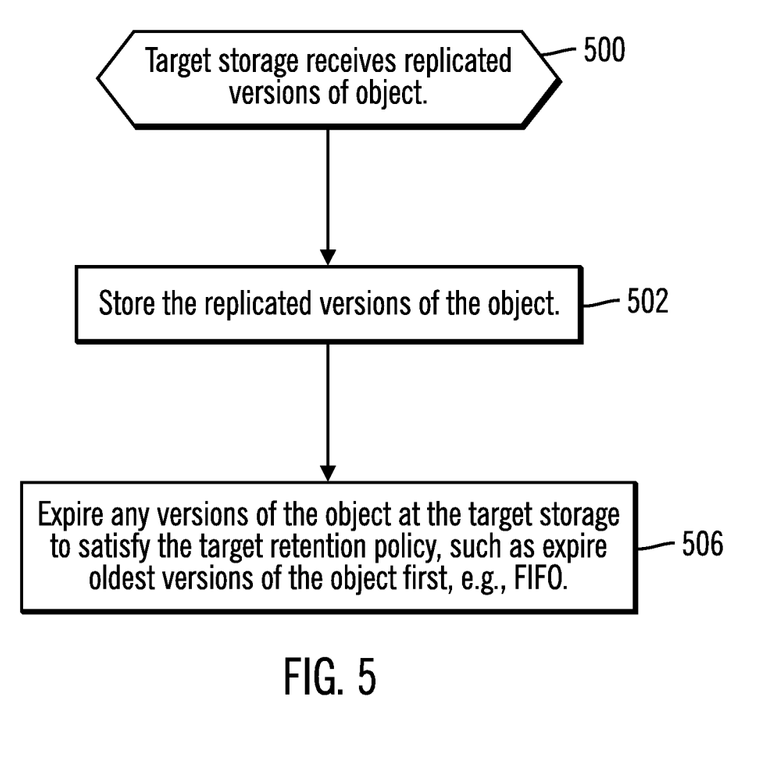
FIG. 5 illustrates an embodiment of operations to process replicated versions of an object at the target storage.

FIG. 5 illustrates an embodiment of operations performed by the target replication manager 106b, or by the source replication manager 106a, to process a replicated version of the object. Upon receiving (at block 500) the replicated version, the target replication manager 106b stores (at block 502) the received replicated version of the object as object version 108b in the target storage 110b. The target replication manager 106b expires (at block 506) any versions of the object necessary to maintain the target retention number of versions specified by the target retention policy, such as by expiring oldest versions of the object first, e.g., FIFO, and any versions not satisfying any target age limit.

With the described operations, separate source 114a and target 114b retention policies having different source and target retention numbers of version limits, respectively, may be provided to determine the number of versions to replicate to the target storage 110b and to independently determine versions of the object 108a and 108b to expire, which may result in a different number of versions of the object on the source 110a and target 110b storages.

Figure 6:
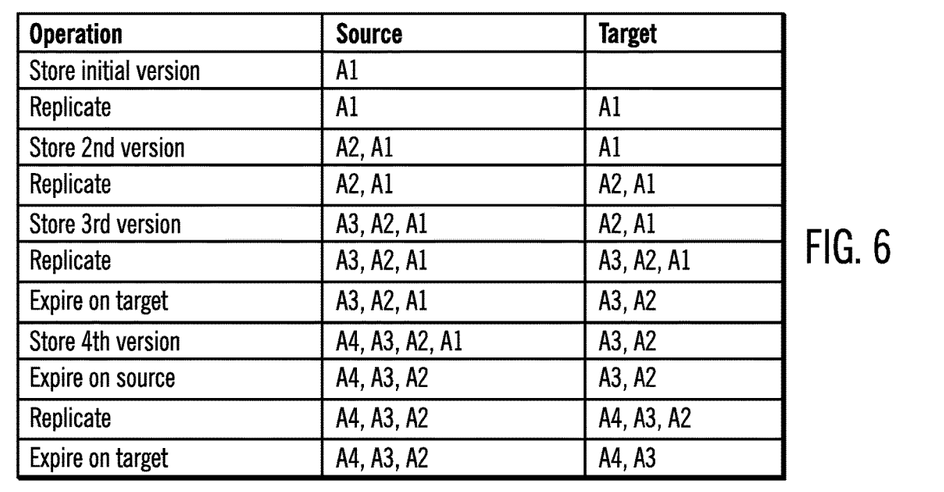
FIGS. 6, 7, and 8 illustrate examples of replicating and expiring versions of objects in accordance with described embodiments.

FIGS. 6, 7, 8, and 9 illustrate examples of the replication and expiration operations described above. In FIG. 6, the source retention policy 114a is to keep one active and two inactive versions and the target retention policy 114b is to keep one active and one inactive versions. A shown in FIG. 6, the replication always sends the new version of the object A1, A2 or A3, but the separate application of the retention policies 114a and 114b results in a different number of versions of the object on the source 110a and target 110b storages.

Figure 7:
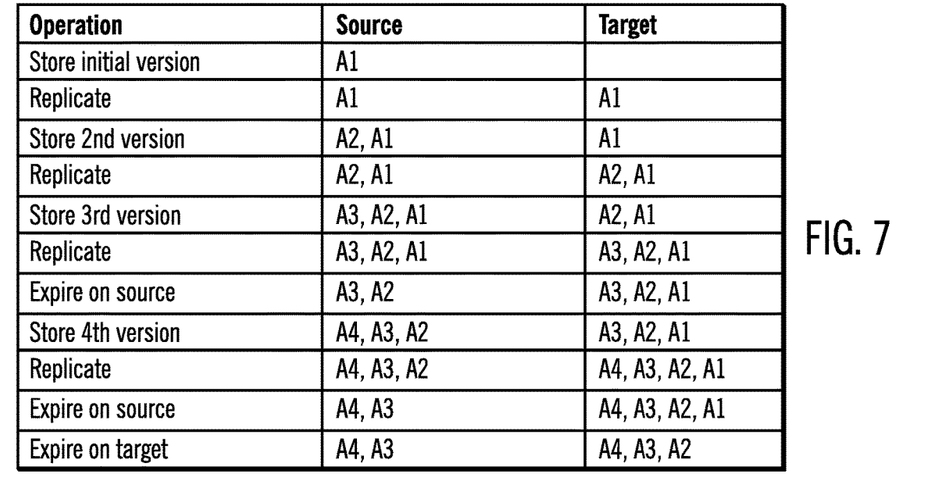

FIG. 7 illustrates an alternative example where the source retention policy 114a is to keep one active and one inactive version and the target retention policy 114b is to keep one active and two inactive versions. As shown in FIG. 7, the replication always sends the new version of the object A1, A2 or A3, but the separate application of the retention policies 114a and 114b results in a different number of versions of the object on the source 110a and target 110b storages.

Figure 8:
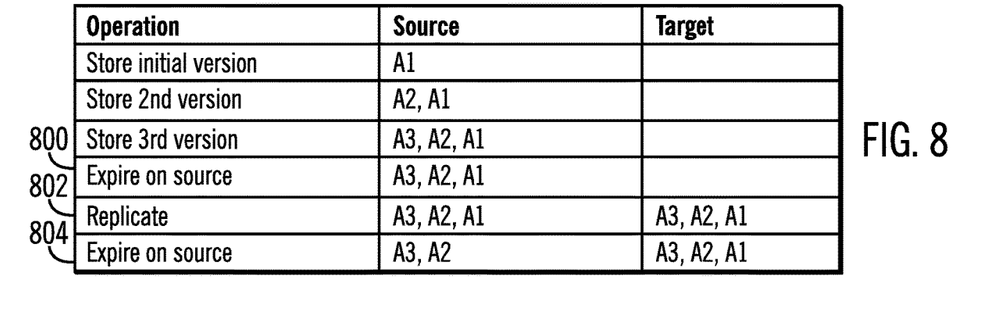

FIG. 8 illustrates an example where the source retention policy 114a is to keep two versions (one active and one inactive) and the target retention policy 114b is to keep three versions (one active and two inactive versions). In FIG. 8, there are a plurality of unreplicated versions after the third version is stored—A3, A2, A1 after storing the third version. However, application of the source retention policy 114a at expiration step 800 would otherwise expire A1, but the application of the expiration at step 800 leaves three versions A3, A2, A1 according to the operations of FIG. 4 to leave enough unreplicated versions to satisfy the target retention policy 114b. After replicating all the unreplicated versions at replication step 802, the application of the source retention policy 114a at expiration step 804 leaves only two versions A3 and A2, and three versions A3, A2, A1 on the target storage whose target retention policy 114b permits three versions to be retained.

Described embodiments permit separate source and target retention policies that allow for different number of versions of an object to be maintained at the source and target storages. Further, the source and target retention policies may be used both to determine the number of unreplicated versions of an object on the source storage to expire as well as to replicate, in order to provide a sufficient number of unreplicated versions to the target storage when the target retention policy permits more versions than the source retention policy and to minimize the number of versions to replicate when the source retention policy permits more versions to be maintained than the target retention policy.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
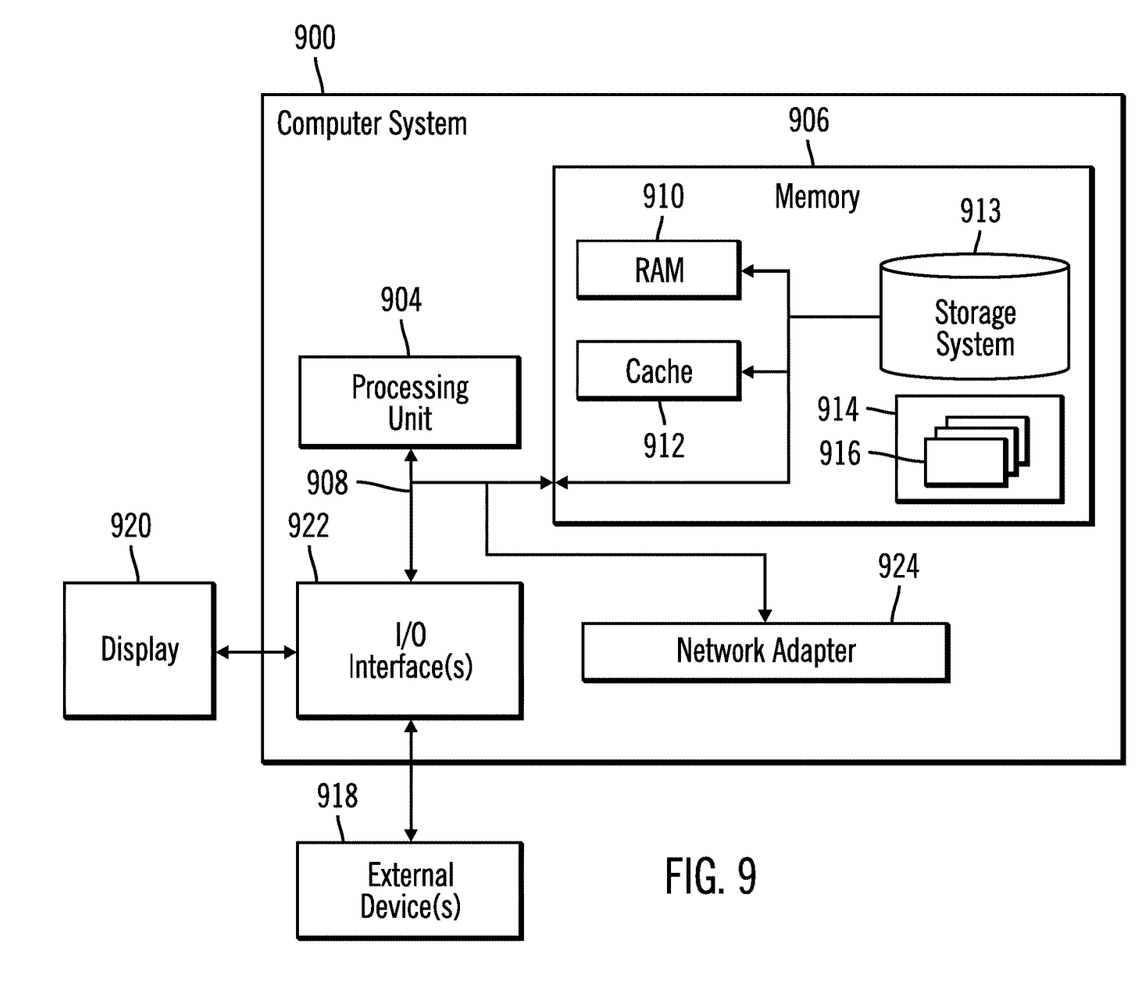
FIG. 9 illustrates a computing environment in which the components of FIG. 1 may be implemented.

The computational components of the computing environment 102, such as the source server 104a and target server 104b may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components may be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for expiring objects replicated from a source storage to a target storage, the computer program product comprising a computer readable storage medium having computer readable program code embodied therein that executes to communicate with a source storage and a target storage and to cause operations, the operations comprising:
    determining whether replication of a version of a plurality of versions of an object at the source storage, wherein the version is not yet replicated to the target storage, would satisfy a target retention policy if replicated to the target storage;
    replicating the version of the object to the target storage in response to determining that the replication of the version to the target storage would satisfy the target retention policy and updating object information to indicate the version as replicated; and
    in response to determining that the replication of the version to the target storage would not satisfy the target retention policy, not replicating the version of the object to the target storage and updating object information to indicate the version of the object as replicated even though the version of the object was not replicated.

2. The computer program product of claim 1, wherein the determining whether replication of the version of the object would satisfy a target retention policy is performed in response to initiating a replication operation to replicate unreplicated versions of the object to the target storage; and
    wherein the updating object information to indicate the version of the object as replicated includes updating both source object information and target object information.

3. The computer program product of claim 2, wherein the operations further comprise:
    determining whether there are a plurality of unreplicated versions of the object at the source storage in response to initiating a replication operation, wherein the determining whether replication of the version of the object would satisfy the target retention policy is performed in response to determining that there are a plurality of unreplicated versions of the object not yet replicated to the target storage; and
    replicating a new version of the object to the target storage in response to determining there are not a plurality of unreplicated versions of the object.

4. The computer program product of claim 1, wherein the determining that replication of the version would satisfy the target retention policy comprises:
    determining whether the replication of the version of the object would satisfy at least one of a target age limit and a target retention number limit, wherein the version of the object is replicated in response to determining that the replication of the version of the object would satisfy at least one of the target age limit and the target retention number limit.

5. The computer program product of claim 4, wherein the version of the object determined to satisfy at least one of the target retention policy and target retention limit comprises a newest unreplicated version of the object, wherein the operations further comprise:
    indicating that all unreplicated versions of the object are replicated in response to determining that the replication of the newest unreplicated version of the object would not satisfy at least one of the target age limit and the target retention number limit.

6. The computer program product of claim 1, wherein the operations further comprise:
    determining whether the version of an object at the source storage needs to be expired to satisfy a source retention policy; and
    determining whether the version of the object is unreplicated in response to determining that the version of the object at the source storage needs to be expired to satisfy the source retention policy, wherein the determining whether replication of the version of the object at the source storage would satisfy the target retention policy is performed for the version of the object having been determined to be unreplicated.

7. The computer program product of claim 6, wherein the operations further comprise:
    expiring the version of the object at the source storage in response to determining that the replication of the version of the object would not satisfy the target retention policy, wherein the version of the object is not expired in response to determining that the replication of the version of the object would satisfy the target retention policy; and
    expiring the version of the object in response to determining that the version of the object is not unreplicated.

8. A system in communication with a source storage to a target storage, comprising:
    a processor; and a computer readable storage medium having computer readable program code that when executed by the processor performs operations, the operations comprising:
- determining whether replication of a version of a plurality of versions of an object at the source storage, wherein the version is not yet replicated to the target storage, would satisfy a target retention policy if replicated to the target storage;
- replicating the version of the object to the target storage in response to determining that the replication of the version to the target storage would satisfy the target retention policy and updating object information to indicate the version as replicated; and
- in response to determining that the replication of the version to the target storage would not satisfy the target retention policy, not replicating the version of the object to the target storage and updating object information to indicate the version of the object as replicated even though the version of the object was not replicated.

9. The system of claim 8, wherein the determining whether replication of the version of the object would satisfy a target retention policy is performed in response to initiating a replication operation to replicate unreplicated versions of the object to the target storage; and
wherein the updating object information to indicate the version of the object as replicated includes updated both source object information and target object information.

10. The system of claim 9, wherein the operations further comprise:
- determining whether there are a plurality of unreplicated versions of the object at the source storage in response to initiating a replication operation, wherein the determining whether replication of the version of the object would satisfy the target retention policy is performed in response to determining that there are a plurality of unreplicated versions of the object not yet replicated to the target storage; and
- replicating a new version of the object to the target storage in response to determining there are not a plurality of unreplicated versions of the object.

11. The system of claim 8, wherein the determining that replication of the version would satisfy the target retention policy comprises:
- determining whether the replication of the version of the object would satisfy at least one of a target age limit and a target retention number limit, wherein the version of the object is replicated in response to determining that the replication of the version of the object would satisfy at least one of the target age limit and the target retention number limit.

12. The system of claim 11, wherein the version of the object determined to satisfy at least one of the target retention policy and target retention limit comprises a newest unreplicated version of the object, wherein the operations further comprise:
- indicating that all unreplicated versions of the object are replicated in response to determining that the replication of the newest unreplicated version of the object would not satisfy at least one of the target age limit and the target retention number limit.

13. The system of claim 8, wherein the operations further comprise:
- determining whether the version of an object at the source storage needs to be expired to satisfy a source retention policy; and
- determining whether the version of the object is unreplicated in response to determining that the version of the object at the source storage needs to be expired to satisfy the source retention policy, wherein the determining whether replication of the version of the object at the source storage would satisfy the target retention policy is performed for the version of the object having been determined to be unreplicated.

14. The system of claim 13, wherein the operations further comprise:
- expiring the version of the object at the source storage in response to determining that the replication of the version of the object would not satisfy the target retention policy, wherein the version of the object is not expired in response to determining that the replication of the version of the object would satisfy the target retention policy; and
- expiring the version of the object in response to determining that the version of the object is not unreplicated.

15. A method for expiring objects replicated from a source storage to a target storage, comprising:
- determining whether replication of a version of a plurality of versions of an object at the source storage, wherein the version is not yet replicated to the target storage, would satisfy a target retention policy if replicated to the target storage;
- replicating the version of the object to the target storage in response to determining that the replication of the version to the target storage would satisfy the target retention policy and updating object information to indicate the version as replicated; and
- in response to determining that the replication of the version to the target storage would not satisfy the target retention policy, not replicating the version of the object to the target storage and updating object information to indicate the version of the object as replicated even though the version of the object was not replicated;
- wherein the determining whether replication of the version of the object would satisfy a target retention policy is performed in response to initiating a replication operation to replicate unreplicated versions of the object to the target storage; and
- wherein the updating object information to indicate the version of the object as replicated includes updating both source object information and target object information.

16. The method of claim 15, further comprising:
- determining whether there are a plurality of unreplicated versions of the object at the source storage in response to initiating a replication operation, wherein the determining whether replication of the version of the object would satisfy the target retention policy is performed in response to determining that there are a plurality of unreplicated versions of the object not yet replicated to the target storage; and
- replicating a new version of the object to the target storage in response to determining there are not a plurality of unreplicated versions of the object.

17. The method of claim 15, wherein the determining that replication of the version would satisfy the target retention policy comprises:
- determining whether the replication of the version of the object would satisfy at least one of a target age limit and a target retention number limit, wherein the version of the object is replicated in response to determining that the replication of the version of the object would satisfy at least one of the target age limit and the target retention number limit.

18. The method of claim 17, wherein the version of the object determined to satisfy at least one of the target retention policy and target retention limit comprises a newest unreplicated version of the object, further comprising:

indicating that all unreplicated versions of the object are replicated in response to determining that the replication of the newest unreplicated version of the object would not satisfy at least one of the target age limit and the target retention number limit.

19. A method for expiring objects replicated from a source storage to a target storage, comprising:

determining whether replication of a version of a plurality of versions of an object at the source storage, wherein the version is not yet replicated to the target storage, would satisfy a target retention policy if replicated to the target storage;

replicating the version of the object to the target storage in response to determining that the replication of the version to the target storage would satisfy the target retention policy and updating object information to indicate the version as replicated; and in response to determining that the replication of the version to the target storage would not satisfy the target retention policy, not replicating the version of the object to the target storage and updating object information to indicate the version of the object as replicated even though the version of the object was not replicated;

determining whether the version of an object at the source storage needs to be expired to satisfy a source retention policy; and determining whether the version of the object is unreplicated in response to determining that the version of the object at the source storage needs to be expired to satisfy the source retention policy, wherein the determining whether replication of the version of the object at the source storage would satisfy the target retention policy is performed for the version of the object having been determined to be unreplicated.

20. The method of claim 19, further comprising:

expiring the version of the object at the source storage in response to determining that the replication of the version of the object would not satisfy the target retention policy, wherein the version of the object is not expired in response to determining that the replication of the version of the object would satisfy the target retention policy; and expiring the version of the object in response to determining that the version of the object is not unreplicated.

* * * * *